United States Patent
Cook et al.

(10) Patent No.: US 9,953,189 B2
(45) Date of Patent: Apr. 24, 2018

(54) MANAGING CONFIGURATIONS OF COMPUTING TERMINALS

(71) Applicant: FSLogix, Inc., Suwanee, GA (US)

(72) Inventors: Randall R. Cook, Mapleton, UT (US); Jeremy Hurren, Eagle Mountain, UT (US); Brian Mann, American Fork, UT (US); Kevin Goodman, Alpharetta, GA (US)

(73) Assignee: FSLOGIX, INC., Suwanee, GA (US)

( * ) Notice: Subject to any disclaimer, the term of this patent is extended or adjusted under 35 U.S.C. 154(b) by 21 days.

(21) Appl. No.: 14/446,983

(22) Filed: Jul. 30, 2014

(65) Prior Publication Data

US 2015/0040181 A1 Feb. 5, 2015

Related U.S. Application Data

(60) Provisional application No. 61/860,189, filed on Jul. 30, 2013.

(51) Int. Cl.
*G06F 21/00* (2013.01)
*G06F 21/62* (2013.01)

(52) U.S. Cl.
CPC .. *G06F 21/6281* (2013.01); *G06F 2221/2141* (2013.01); *G06F 2221/2149* (2013.01)

(58) Field of Classification Search
CPC ......... G06F 21/6281; G06F 2221/2149; G06F 2221/2141
USPC .................................. 726/1, 26, 27; 705/51
See application file for complete search history.

(56) References Cited

U.S. PATENT DOCUMENTS

| | | | |
|---|---|---|---|
| 8,739,274 B2* | 5/2014 | Khemani | H04L 63/0485 709/218 |
| 2006/0074989 A1 | 4/2006 | Laborczfalvi et al. | |
| 2006/0075381 A1* | 4/2006 | Laborczfalvi | G06F 9/468 717/100 |
| 2006/0120526 A1 | 6/2006 | Boucher et al. | |
| 2007/0261120 A1* | 11/2007 | Arbaugh | G06F 21/57 726/26 |
| 2009/0106780 A1* | 4/2009 | Nord | G06F 9/5077 719/329 |
| 2009/0132801 A1 | 5/2009 | White et al. | |
| 2009/0254390 A1* | 10/2009 | Megiddo | G06Q 10/10 709/220 |
| 2011/0113427 A1* | 5/2011 | Dotan | G06F 9/455 718/1 |

(Continued)

OTHER PUBLICATIONS

International Patent Application No. PCT/US2014/048978, International Search Report and Written Opinion, dated Dec. 29, 2014, 19 pages.

(Continued)

*Primary Examiner* — Sarah Su
(74) *Attorney, Agent, or Firm* — Kilpatrick Townsend & Stockton LLP (57) ABSTRACT

Disclosed is a system for configuring a terminal by intercepting requests, such as Input/Output (IO) requests or registry requests, evaluating rules based on the intercepted requests during runtime, and performing actions based on the rule evaluations, such as passing the request through, redirecting the request, modifying the request, hiding resources, or performing other actions. The system can be implemented in one or more of the terminal's file system filter drivers and registry filter drivers.

14 Claims, 8 Drawing Sheets

(56) References Cited

U.S. PATENT DOCUMENTS

| | | |
|---|---|---|
| 2012/0185661 A1 | 7/2012 | Desai et al. |
| 2012/0297374 A1 | 11/2012 | Cook |
| 2013/0318339 A1* | 11/2013 | Tola .................... H04L 63/0478 |
| | | 713/150 |
| 2014/0150066 A1* | 5/2014 | Chandolu ........... G06F 21/6218 |
| | | 726/4 |
| 2014/0201807 A1* | 7/2014 | White .................... G06F 21/53 |
| | | 726/1 |

OTHER PUBLICATIONS

International Patent Application No. PCT/US2014/048978, Invitation to Pay Additional Fees, and, Where Applicable, Protest Fee, dated Oct. 24, 2014, 2 pages.

* cited by examiner

MANAGING CONFIGURATIONS OF COMPUTING TERMINALS

CROSS REFERENCE TO RELATED APPLICATIONS

The present application claims the benefit of U.S. Provisional Application No. 61/860,189 filed Jul. 30, 2013 entitled "MANAGING CONFIGURATIONS OF COMPUTING TERMINALS," which is hereby incorporated by reference in its entirety.

TECHNICAL FIELD

The present disclosure relates to computing generally and more specifically to computer operating systems.

BACKGROUND

It is sometimes desirable, or even required, to configure computing terminals differently for different users and/or in different contexts. For example, in a multi-user computing environment, networked-connected terminals may be accessed and used by many different users. A user may login to a terminal using a user name and password or other credentials. In a typical multi-user computing environment, each user may be presented with a managed desktop upon login. The managed desktop may have a default configuration or a customized (or partially customized) configuration according to a profile associated with the user's account. For example, the profile may specify that the user requires access to certain applications, directories, files and/or other objects that other users may not be authorized to access. The managed desktop maintains security by controlling the software and hardware configurations of the terminal, as well as its connection settings.

A multi-user terminal is typically assigned a set of core applications that is available to all users who login to that particular terminal. Users with appropriate credentials may be permitted to access and/or install additional applications. To conserve local memory on the terminal, most applications (in some cases, even the core applications assigned to the terminal) may be configured to run from a network server. Alternatively, some applications may be installed or at least temporarily installed on the terminal, while many of the libraries and other files associated with those locally-installed applications are hosted by the network server.

Therefore, upon initiation of each new user session (e.g., when a user logs in to the terminal), a multi-user terminal is typically configured or reconfigured to provide the user with access to network-hosted applications and other applicable resources. For example, shortcuts located in the "Start" menu or on the desktop of the terminal and related registry-based settings may be configured to redirect to or interact with network-hosted application, files and other resources, as applicable. In some cases, shared folders that store local copies of applications can be configured for automatic caching so that application files are cached at the workstation on first use. When the user session is terminated, the terminal may be returned to its default configuration, meaning that any applications, files, data or other objects that may have been installed, cached or otherwise stored on the terminal during the user session are removed.

Similarly, there are often reasons for varying the configurations of personal computing terminals, including desktop computers, laptop computers, tablets, smart phones, e-readers and other computing devices. Any such device may be configured to provide different access and/or usage privileges based on login credentials and/or other conditions. For example, depending on the identity and privileges of the owner and/or intended user of a computing terminal, certain software applications, data files and other resources may be pre-installed on a personal computing terminal or installed upon start-up. In some cases, certain software applications, data files and other resources may be added to or removed from the computing terminal when the user's privileges change or when a different user logs-in.

Due to the size, complexity and robustness of modern applications, ad hoc configuration of computing terminals has become a time-consuming process. Users often experience relatively significant wait times while their user sessions are initiated and their terminals are configured according to their user profiles. This can be annoying to the user and also taxing on network resources. Therefore, what is needed is a more efficient way to manage the configuration of computing terminals, while still providing necessary security on a per-user basis.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed is a system for configuring a terminal by intercepting requests, such as Input/Output (IO) requests or registry requests, evaluating rules based on the intercepted requests during runtime, and performing actions based on the rule evaluations, such as passing the request through, redirecting the request, modifying the request, hiding resources, or performing other actions. The system can be implemented in one or more of the terminal's file system filter drivers and registry filter drivers.

Disclosed are embodiments for a terminal configuration management service installed and operating locally on a computing terminal for controlling the software and hardware configurations of the terminal, as well as its connection settings. In general, rather than applications and other resources (including, software, hardware, data, etc.) being installed on, transferred to or otherwise made accessible to a properly configured computing terminal during an authorized user session, the applications and resources are stored locally on the terminal and the terminal configuration management service "hides" them from unauthorized users. Users without proper authorization may thus be unaware of the presence of certain applications and other resources. If a user somehow determines or suspects that a particular "hidden" application or resource is installed and tries to access it, the terminal configuration management service will block or deny the access attempt.

In some embodiments, the terminal configuration management service is implemented as, or is configured with the functionality of, a file system filter driver and a registry filter driver. The terminal configuration management service is thus referred to herein as a "file and registry filter driver" (FRXDRV). Such embodiments may be particularly relevant to computing terminals running operating systems based on the Windows NT kernel, e.g., Windows 2000, Windows XP, Windows Vista, Windows 7, Windows 8 and their server counterparts, etc. Although embodiments are described herein with reference to Windows NT-based operating systems, those skilled in the art will appreciate that the principles and functionality of the present invention can be similarly applied to other operating systems.

Figure 1:
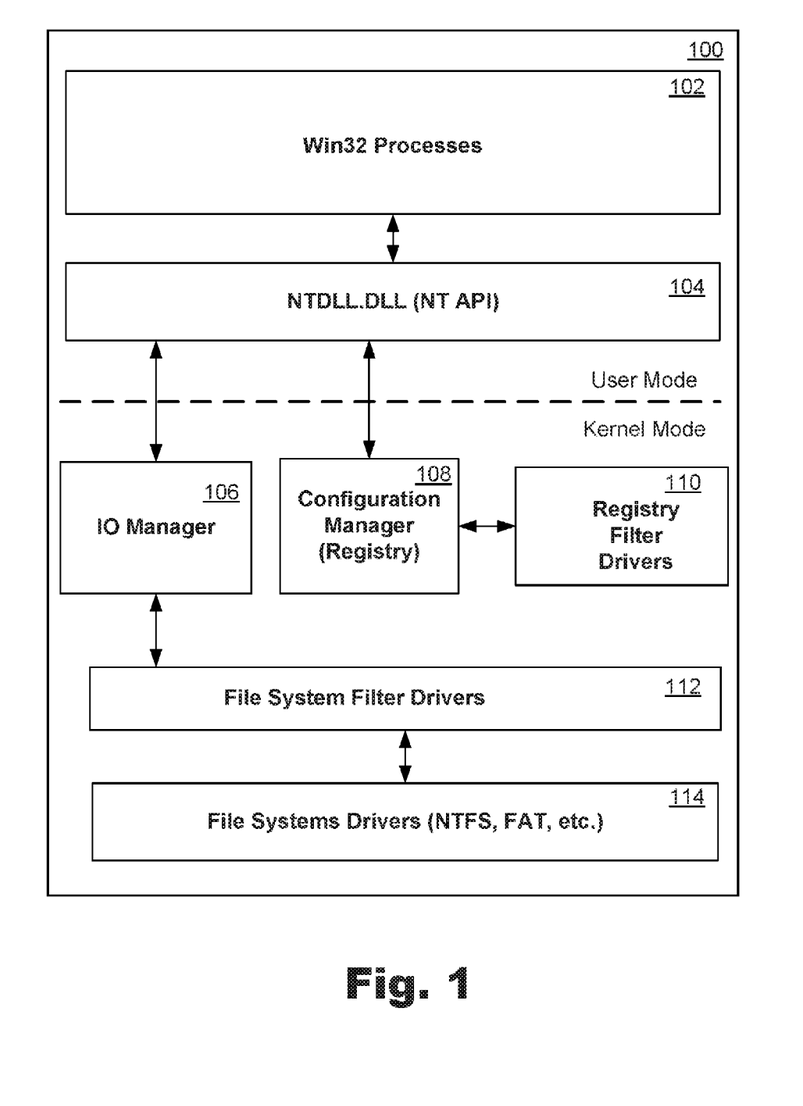
FIG. 1 is a simplified block diagram of a typical Windows NT-based operating system structure according to one embodiment.

By way of context, FIG. 1 is a simplified block diagram of a typical Windows NT-based operating system structure 100. The figure illustrates certain components of the operating system structure 100 that are relevant to the embodiments of the present invention described herein. These components include Win32 processes 102, an NTDLL.DLL 104, an IO Manager 106, a configuration manager 108, a registry filter driver 110, file system filter drivers 112, and file system drivers 114. These components are explained below in a high-level summary fashion; additional details and components of a Windows NT-based operating system structure 100 are well known within the art and are omitted herein for brevity.

Win32 processes 102 are the applications and services that are running on a Windows terminal. Win32 processes initiate calls to the file system drivers 114 (which interact with the underlying file system) and the configuration manager 108 by calling win32 APIs (not shown), such as CreateFile, RegOpenKey, etc. The win32 API layer in turn calls corresponding user mode NT APIs (not shown) in the NTDLL.DLL 104, which provides the native Windows NT API set. For example, NTDLL.DLL 104 includes user mode Windows NT APIs like NtCreateFile, NtOpenKey, etc. User mode NT APIs typically match up one-to-one with a kernel mode API. For example, NtCreateFile maps to the ZwCreateFile API.

The IO manager 106 takes the parameters passed to a particular function and creates a corresponding Interrupt Request Packet (IRP). An IRP is a memory structure that contains all of the information about the request that will be passed to lower components within the operating system. File system filter drivers (FSFDs) 112 are kernel components that are loaded and inserted into the communication path between the IO manager 106 and the file system drivers 114. FSFDs 112 essentially "intercept" all IO within the operating system before it gets to the file system drivers 114.

FSFDs 112 can also actively modify IO requests or complete IO requests themselves. There are several classes of FSFDs 112 like antivirus, undelete, backup, virtualization, activity monitoring, etc. FSFDs 112 can be implemented in a stack with a configurable priority among them. In some configurations (e.g., in Windows 7 and later versions of the Windows NT operating system), a FSFD 112 may be implemented as a filter manager that provides for the creation and management of "mini-filter drivers," which can perform functions such as antivirus, undelete, backup, virtualization, activity monitoring, etc.

The configuration manager 108 implements the registry. It handles all registry API calls and stores the registry information in multiple database files. It also provides a filtering interface that allows for the implementation of registry filter drivers 110, which are somewhat similar in functionality to FSFD 112, at least conceptually. In particular, a registry filter driver 110 is a kernel component that registers with the configuration manager 108 to intercept, handle and possibly modify registry calls. Registry filter drivers 110 can thus be configured as registry IO handlers.

Figure 2:
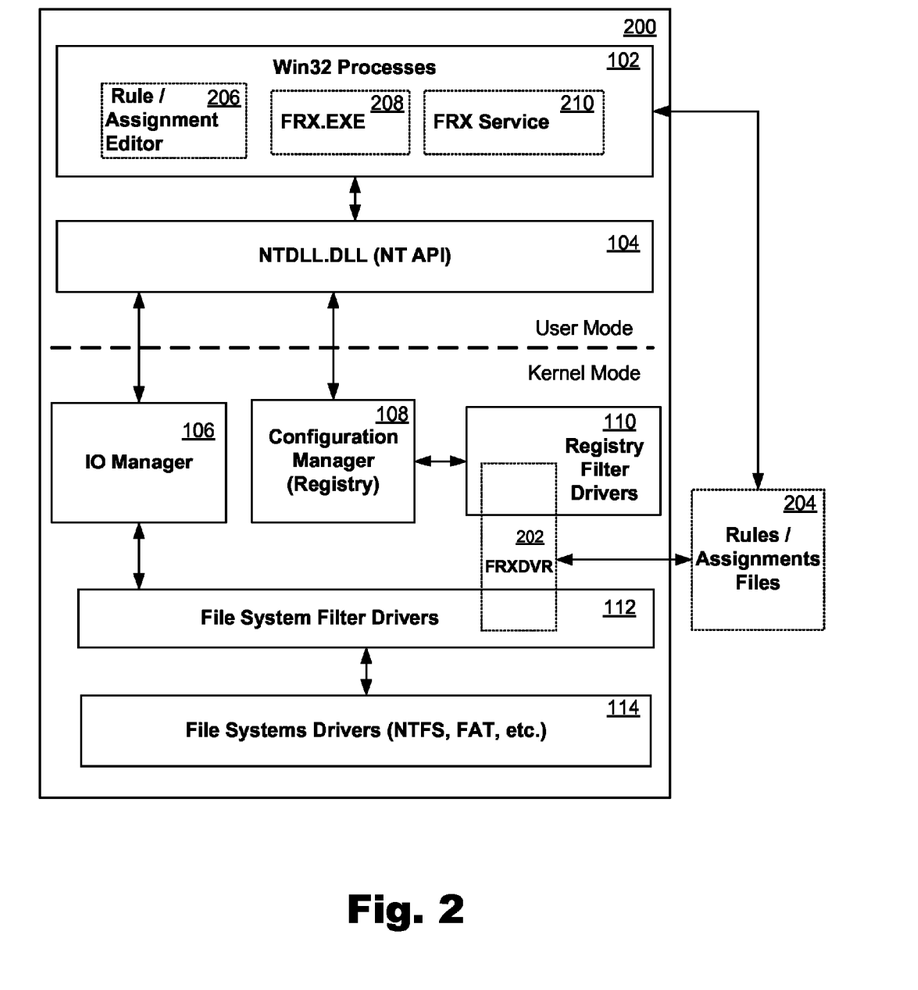
FIG. 2 is a simplified block diagram of the present invention as implemented in connection with a typical Windows NT-based operating system structure according to one embodiment.

FIG. 2 is a simplified block diagram of an embodiment of the present invention as implemented in connection with a typical Windows NT-based operating system structure 200. A FRXDRV 202, configured to perform the functionality described with respect to FIGS. 3-8 and elsewhere herein, may be implemented within the FSFD 112 stack and the registry filter driver 110 stack. For example, portions of the FRXDRV 202 may be implemented as a FSFD 112 (or a mini-filter driver) and portions may be implemented as a registry filter driver 110. Other manners of implementing the FRXDRV 202 will also be apparent to those of skill in the art.

IO requests handled by the IO manager 106 and registry IO requests handled by the configuration manager 108 can be intercepted and handled by the FRXDRV 202. As will be described in more detail, the functionality provided by the FRXDRV 202 allows an administrator to "hide" the presence of a directory, file, registry key, registry value or other resource. These objects remain stored within the local memory of the terminal, but are hidden from the user.

The FRXDRV 202 can be configured to hide different resources or types of resources for different users, for example based on access authorization credentials or other criteria assigned to or associated with a user or group of users. For example, different sets of resources may be hidden for different users or different groups of users, who each may therefore have a significantly different view of the same computing terminal. In some embodiments, the FRXDRV 202 may be configured to hide different resources or types of resources for or during different processes, threads, sessions, etc. In some embodiments, the FRXDRV 202 may be configured to start or stop hiding certain resources based on trigger events such as schedule, location of the user and/or terminal, network access, etc.

The operations to be performed by the FRXDRV 202 may be specified by way of one or more rules/assignments files 204. For example, an administrator can create a rule that specifies one or more objects to be hidden (file, directory, key, or value) and any applicable conditions or trigger events. The administrator may then assign the rule to one or more specific user or groups of users. In some embodiments, rules may be stored in one file and corresponding assignments may be stored in another associated file, at least initially. In other embodiments, rules and corresponding assignments may be stored in the same file. These and other methods for implementing rules and assignments will occur to those skilled in the art and are deemed to be within the scope of this disclosure.

In some embodiments, a rule/assignment editor tool 206, which may be implemented as a program module, plug-in, script, or any other executable may be provided to facilitate the creation and modification of rules and assignments. The rule/assignment editor tool 206 may in some embodiments be a GUI-based tool. Alternatively or additionally, a command line component, referred to herein as "frx.exe" 208, can be provided for creating and adding rules/assignments, deleting rules/assignments, triggering reloads of rules/assignments files 204 by the FRXDRV 202, etc. These components may be provided on the computing terminal where the FRXDRV 202 is executed and/or may be provided on an administrator terminal such that the rules/assignments files 204 can be distributed to any number of computing terminals.

A file and registry filter service (FRX Service) 210 may also be provided to operate in conjunction with the FRXDRV 202. The FRX Service 210 may be implemented as an executable or other program module. This service may be configured to accept commands from the command line component FRX.EXE 208 and/or the rule/assignment editor tool 206, compile rules/assignments files 204 from user format to driver format, watch for updates to rules/assignments file(s) 204 appear, and notify the FRXDRV 202 when such updates are detected. As such, the FRX Service 210 may be provided on the computing terminal where the FRXDRV 202 is executed and/or on an administrator terminal. For example, the FRX Service 210 may determine that new rules/assignments files 204 have been created, compile those files and store them in a folder or other location accessible to the FRXDRV 202. The FRX Service 210 may then notify the FRXDRV 202 that there are new rules/assignments files 204 to process.

Figure 3:
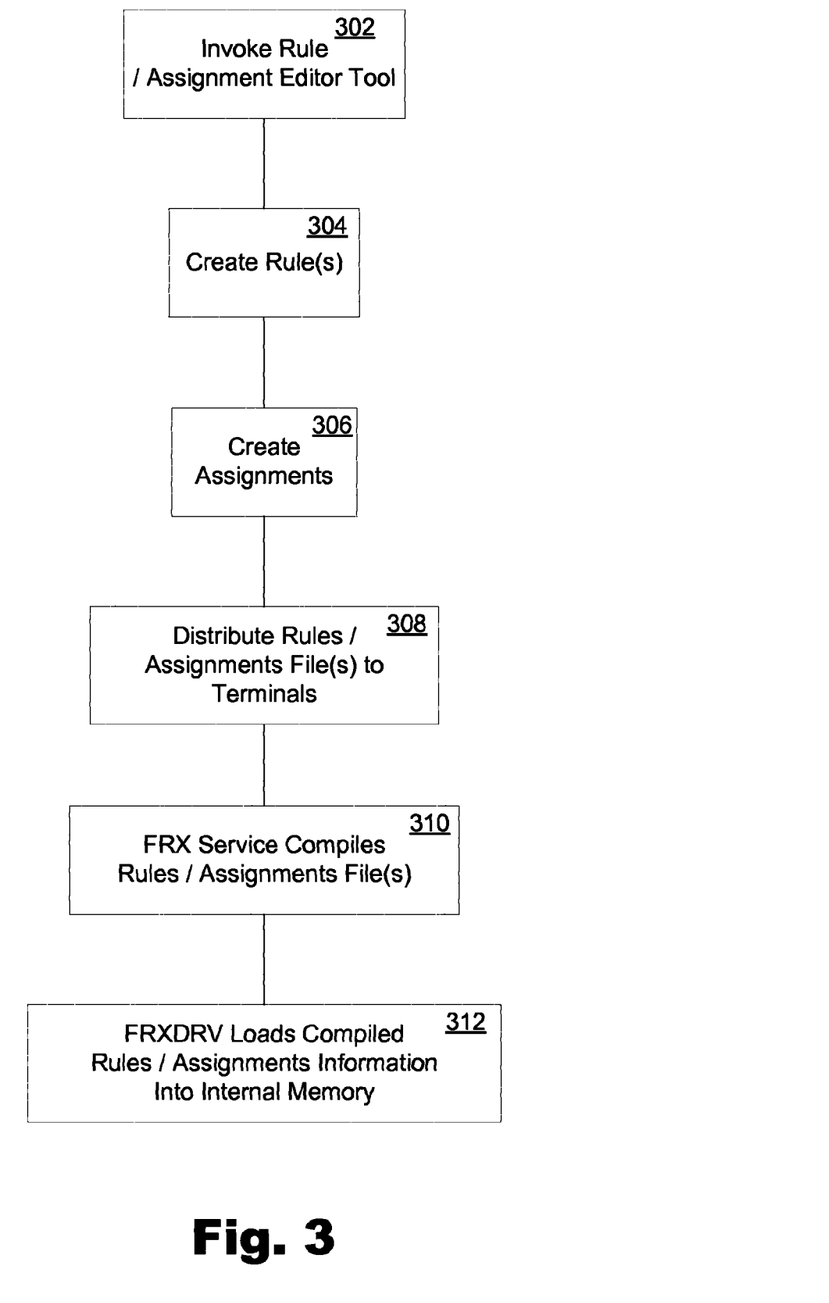
FIG. 3 is a process flow diagram illustrating a process for creating and distributing rules/assignments files according to one embodiment.

FIG. 3 is a process flow diagram illustrating a process for creating and distributing rules/assignments files 204 for processing by the FRXDRV 202 according to one embodiment. The process begins at block 302 where a rule/assignment editor tool 206 is invoked by an administrator or other entity responsible for configuring the relevant computing terminals. At block 304 the desired rules are created and at block 306 the desired assignments are created. The rules and assignments are stored in one or more rules/assignments file(s) 204.

At block 308, the rules/assignments file(s) 204 are distributed to the applicable computing terminals. In some case, the same rules/assignments files 204 will be distributed to all computing terminals under management, so that each terminal will be configured to implement the same rules to "hide" the relevant resources from the relevant users. In other implementations, the rules/assignments file(s) 204 applicable to certain users or groups of users may be distributed to only those computing terminals under management that such users/groups are able to access (based on user credentials, location, etc.) At block 310, the FRX Service 210 executed at a computing terminal receives and compiles the new rules/assignments file(s) 204 and notifies the FRXDRV 202 that the new rules/assignments file(s) 204 are available. Then, at block 312, the FRXDRV 202 loads the compiled rules/assignments information into its internal memory structures for processing.

The FRXDRV 202 may thus be configured to use the rules/assignments information in determining whether to "hide" certain resource from the user. For example, when the FRXDRV 202 receives an IO request or registry IO request to enumerate files, directories, keys, or values that are determined to be hidden based on rules/assignments information, the FRXDRV 202 may be configured to pass the operation request to the file system drivers 114, configuration manager 108 or other operating system components, as applicable, and to receive the results. The FRXDRV 202 may then remove the undesired (i.e., hidden) entries from the results and then complete the IO request or registry IO request by passing the altered results back up to the caller entity, e.g., the filter manager, the IO manager 106, or the configuration manager 108.

Similarly, if the FRXDRV 202 receives an IO request or registry IO request to create an object, it may consult its internal data structures to determine if there is an object being hidden with the same name. If so, rather than allowing the request to proceed, the FRXDRV 202 may be configured to complete the request by passing to the caller entity a status message such as "ACCESS_DENIED" or the like. As another example, when the FRXDRV 202 receives an IO request to open a file or access another resource, it may determine based on the applicable rules/assignments information in its internal data structures whether the request is for a resource that is hidden. If so, the FRXDRV 202 may be configured to complete the request by passing to the caller entity a status message such as "FILE_NOT_FOUND" or the like.

Accordingly, the FRXDRV 202 may include functionality to parsing and responding to different types of IO requests in different manners, with the common end result being that access to the requested objects is denied so that it appears to the user that the requested objects are not present on the terminal. Examples of such functionality are described below with reference to FIGS. 4-8.

Figure 4:
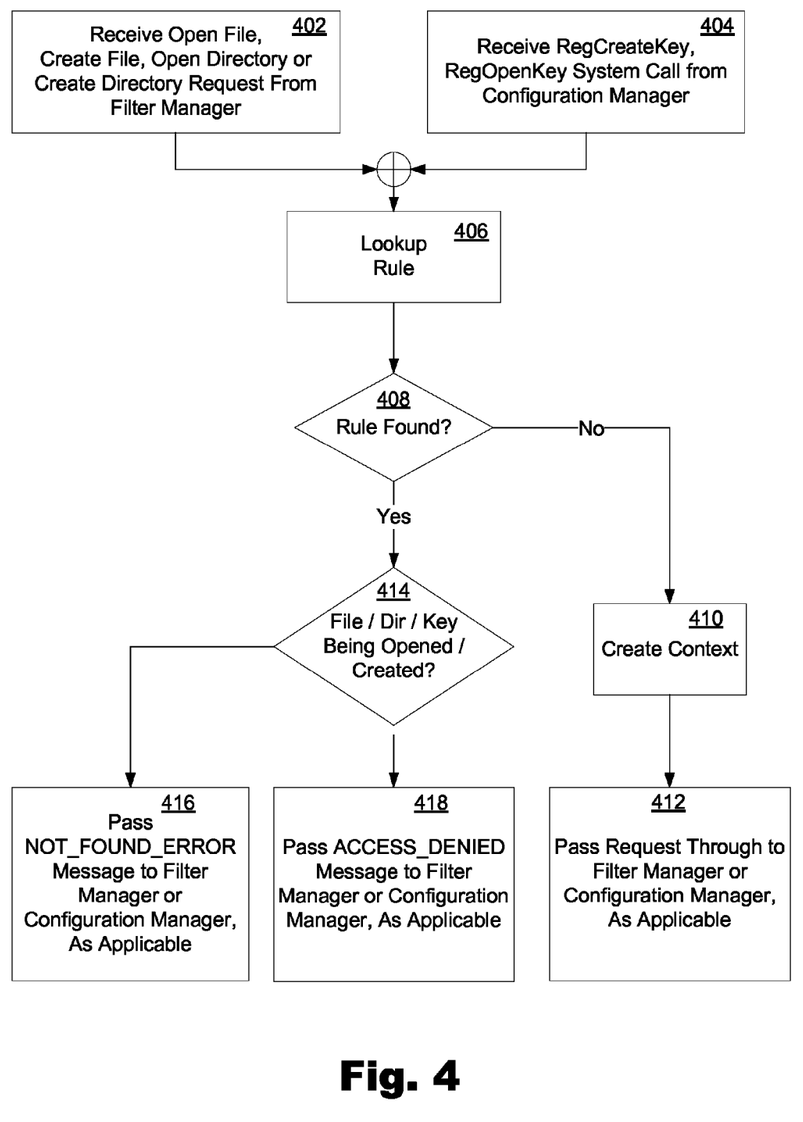
FIG. 4 is a process flow diagram illustrating a process for hiding a file, directory or registry key in response to an open or create request according to one embodiment.

FIG. 4 is a process flow diagram illustrating operation of the FRXDRV 202 for hiding a file, directory or registry key in response to an open or create request, in accordance with certain embodiments of the invention. The process begins at either block 402, where an Open File, Create File, Open Directory or Create Directory request is received from the filter manager, or at block 404, where a RegCreateKey or RegOpenKey system call is received from the configuration manager. After receiving the request to perform one of such operations, the FRXDRV 202 checks its internal data structures for any rules/assignments information applicable to the relevant file, directory or registry key at block 406. If it is determined at block 408 that there is no rule to be applied for the relevant file, directory or registry key, the requested file, directory or registry key is deemed to not be "hidden" and the process continues to block 410, in which a context for the request is created, which, for example, may be cached and used for subsequent operations. Then, at block 412, the request is passed-through (returned) to the filter manager or the configuration manager, as applicable, for further processing. For example, the filter manager may invoke another FSFD 112 or may pass the request to the appropriate file system driver 114 to open or create the requested file or directory. Similarly, the configuration manager may invoke another registry filter or may process the request to open or create the requested registry key.

If it is determined at block 408 that there is a rule to be applied for the relevant file, directory or registry key, i.e., the file, directory or registry key is "hidden," the process proceeds to block 414. If it is determined at block 414 that the request is to open a file, directory or registry key, the FRXDRV 202 completes the request by returning a "NOT_FOUND_ERROR" or similar message to the filter manager or configuration manager, as applicable, at block 416. If it is determined at block 414 that the request is to create a file, directory or registry key, the FRXDRV 202 completes the request by returning an "ACCESS_DENIED" or similar message to the filter manager or configuration manager, as applicable, at block 418.

Figure 5:
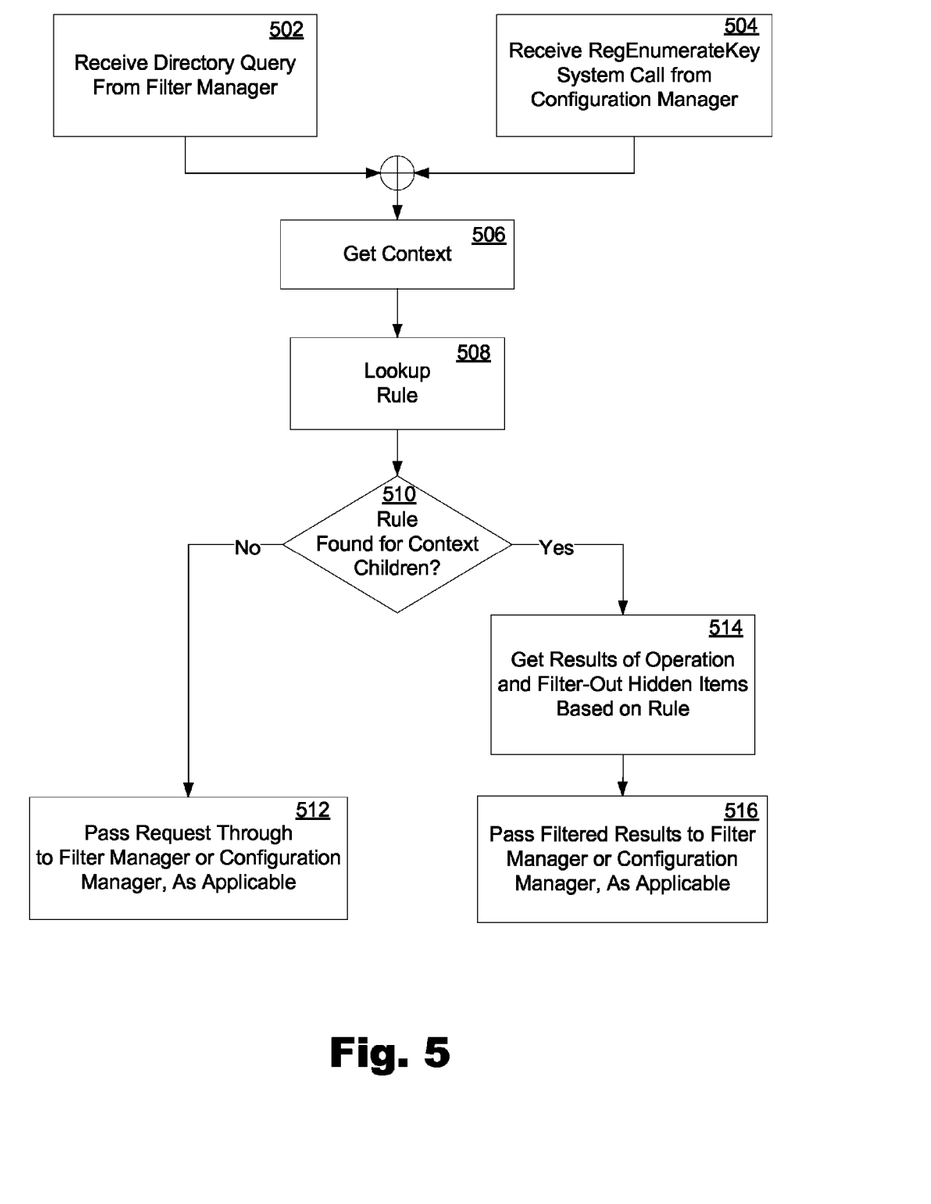
FIG. 5 is a process flow diagram illustrating a process for hiding a directory or registry key in response to a query or enumeration request according to one embodiment.

FIG. 5 is a process flow diagram illustrating operation of the FRXDRV 202 for hiding a directory or registry key in response to a query or enumeration request, in accordance with certain embodiments of the invention. The process begins at either block 502, where a directory query is received from the filter manager, or at block 504, where a RegEnumerateKey system call is received from the configuration manager. After receiving the request to perform one of such operations, the FRXDRV 202 retrieves the context for the requested operation at block 506. Next, at block 508 the FRXDRV 202 checks its internal data structures for any rules/assignments information applicable to the children of the identified context item (e.g., subkeys or values if the context item is a registry key; subdirectories or files if the context item is a directory in the file system). If it is determined at block 510 that there is no rule to be applied for the children of the context item, the children are deemed to not be "hidden" and the process continues to block 512, in which the request is passed-through (returned) to the filter manager or the configuration manager, as applicable, for further processing.

If it is determined at block 510 that there is a rule to be applied for the children of the identified context, i.e., the children are "hidden," the process proceeds to block 514. At block 514 the FRXDRV 202 interacts with lower layers of the operating system stack to get the results of the requested operation and then filters-out the "hidden" items based on the applicable rule. Then at block 516, the FRXDRV 202 passes filtered results to the filter manager or configuration manager, as applicable.

Figure 6:
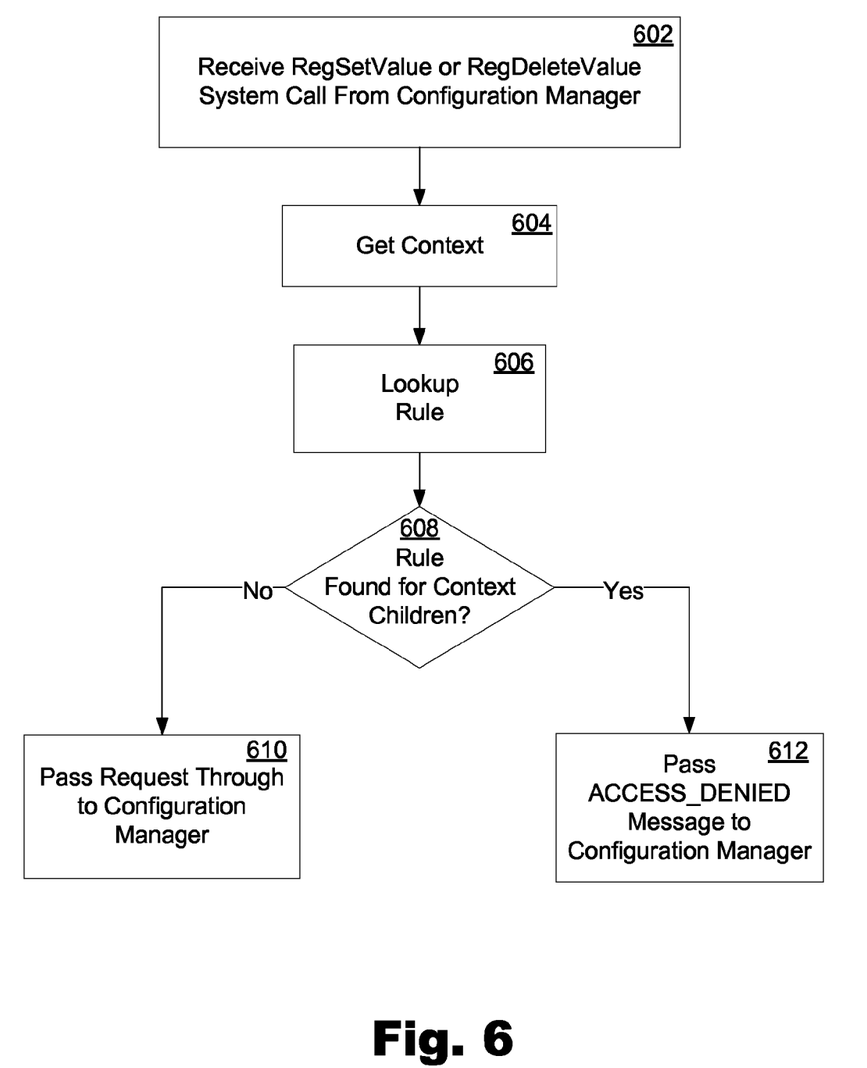
FIG. 6 is a process flow diagram illustrating a process for hiding a registry value in response to a system call for setting or deleting the registry value according to one embodiment.

FIG. 6 is a process flow diagram illustrating operation of the FRXDRV 202 for hiding a registry value in response to a system call for setting or deleting the registry value, in accordance with certain embodiments of the invention. The process begins at block 602, where a RegSetValue or RegDeleteValue system call is received from the configuration manager. After receiving the system call, the FRXDRV 202 retrieves the context from the call parameters at block 604. Next, at block 606 the FRXDRV 202 checks its internal data structures for any rules/assignments information applicable to the children of the identified context item. If it is determined at block 608 that there is no rule to be applied for the children of the context item, the children are deemed to not be "hidden" and the process continues to block 610, in which the request is passed-through (returned) to the configuration manager for further processing. However, if it is determined at block 608 that there is a rule to be applied for the children of the identified context, i.e., the children are "hidden," the process proceeds to block 612. At block 612 the FRXDRV 202 passes an ACCESS_DENIED or similar message to the configuration manager.

In some embodiments, the FRXDRV 202 may additionally or alternatively be configured to redirect requests to open or modify certain objects (e.g., file, directories, registry keys, or registry values) to new locations. As described above, the administrator may create rules and assignments to specify the sources and destinations for each redirect operation. A flag may also be set to indicate whether the original object is to be copied on initial redirect. The rules/assignments files 204 may then be processed/compiled by the FRX Service 210 and stored in a location accessible to the FRXDRV 202. The FRX Service 210 then notifies the FRXDRV 202 that there is a new rules/assignments file 204 that needs to be loaded.

The FRXDRV 202 opens the rules/assignments file 204 and loads the rules/assignments information into its internal data structures. Then when an open/create request is issued for a directory, file, or a registry key, or when a modify request is issued for a registry value, the FRXDRV 202 intercepts the request and looks at the rules/assignments information in its internal data structures to determine if the request should be redirected. If so, the FRXDRV 202 re-targets the request to the new location (as determined by the destination specified in the applicable rule).

Figure 7:
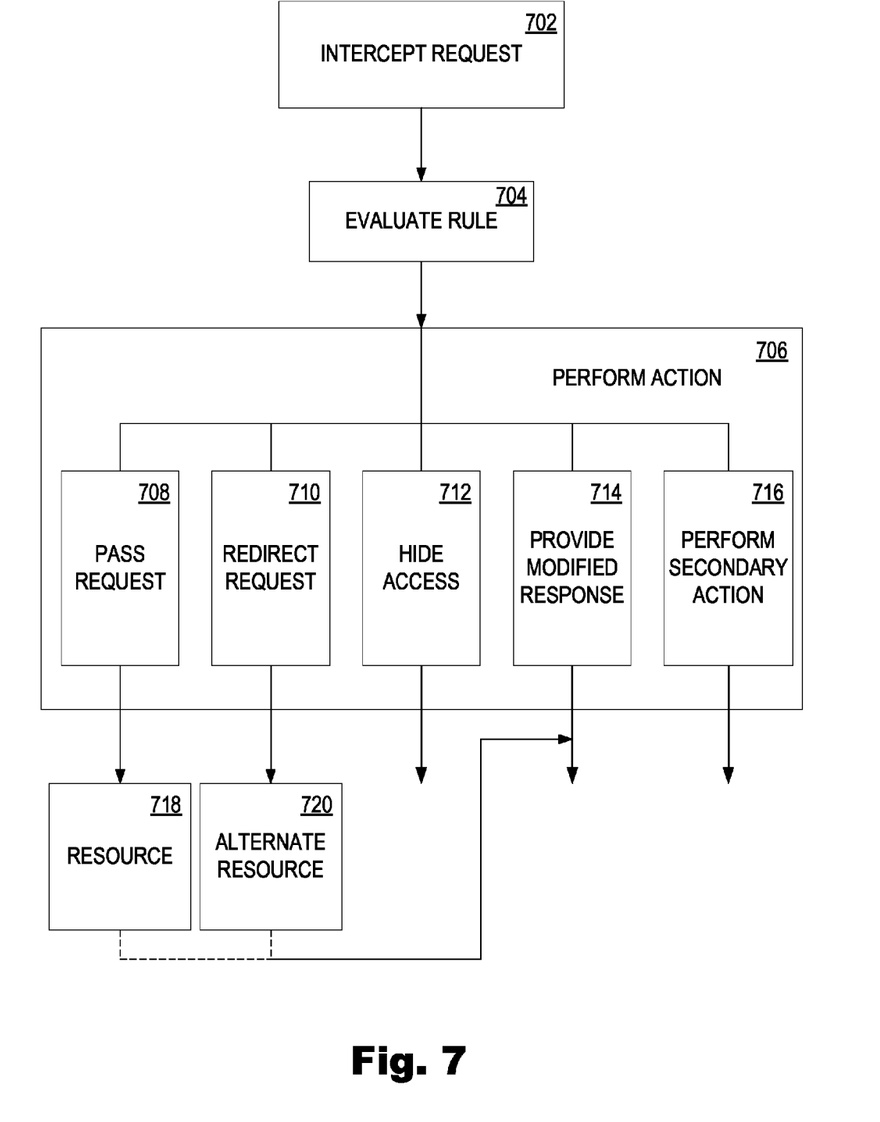
FIG. 7 is a process flow diagram illustrating operation of the FRXDRV performing certain actions based on rules, according to one embodiment.

FIG. 7 is a process flow diagram illustrating operation of the FRXDRV 202 performing certain actions based on rules, according to one embodiment. At block 702, the FRXDRV 202 can intercept a request. Examples of a request can include requests to read or write information to a file system, a registry, or any other suitable location. At block 704, the FRXDRV 202 can evaluate a rule. As described above, the rule can be located in one or more rules/assignments files 204. The rule can be evaluated in runtime. The rule can evaluate variables, such as variables accessible in runtime. Examples of variables that can be evaluated include, but are not limited to, current time, current date, current user, user group of the current user, location of the current user, number of licenses of a resource currently in use, or other suitable variables. Based on the evaluation of the rule at block 704, the FRXDRV 202 can perform an action at block 706.

In examples where the rule evaluates at block 704 to allow unrestricted and/or unmodified access to a resource, the action performed at block 706 can be to pass the request at block 708, to the intended resource 718. In embodiments where no rule exists to be evaluated at block 704, the FRXDRV 202 can simply pass the request along at block 708.

In examples where the rule evaluates at block 704 to redirect the request, the action performed at block 706 can be to redirect the request at block 710 to an alternate resource 720. The alternate resource 720 can be located on the same system (e.g., the same computer terminal) or can be located on a remote system (e.g., accessible via a network). The redirected request can be modified as necessary (e.g., change of filename or address).

In some embodiments, the alternate resource 720 may include a different version of the same software located in the resource 718. For example, when a user attempts to access a particular website that requires JAVA resources, the FRXDRV 202 can intercept the request for JAVA resources at block 702, a rule can be evaluated at block 704 to determine that an older version of JAVA should be used, and the action performed at block 706 can be to redirect the request at block 710 to an alternate resource 720 which contains the older version of JAVA. In such an example, neither the user nor any user-mode applications realize that the request for JAVA resources has been redirected, as the FRXDRV 202 has intercepted the request and redirected it during runtime.

In another example, a user can initiate a request to attempt to access a resource (e.g., a piece of software or a document) that appears to be located on the user's local system. The FRXDRV 202 can intercept the request at block 702 and evaluate a rule at block 704 to determine where that user should be directed to obtain that user's version of the resource. The result of evaluating the rule at block 704 can cause the FRXDRV 202 to perform an action at block 706 to redirect the request 710 to an alternate resource 720 that is specific to that user. For example, each user of a network can have a private version of that particular resource that is located in a different location. While each user may appear to be accessing the same resource, the FRXDRV 202 is handling redirection of the request to provide the user with access to that user's private version of the resource.

In examples where the rule evaluates at block 704 to hide access to a requested resource, the action performed at block 706 can be to hide access at block 712. The FRXDRV 202 can hide access at block 712 by either providing a response indicative that the requested resource does not exist, even if the resource does exist. The FRXDRV 202 can alternately hide access at block 712 by indicating that the user does not have proper permissions to access the resource.

Access to a requested resource may be hidden for various reasons. In an example, access to a resource may be hidden to reduce the number of licenses a company may need to purchase, for example the number of font licenses a company may need to purchase. In such an example, a company may purchase 50 licenses to a particular font. When users in the company's network load operating systems and/or applications in their respective terminal systems, any requests to populate a font list may be intercepted at block 702. A rule may be evaluated at block 704 to determine whether each user has requested access or is given access to the particular font. If access is not given to the font for that particular user, or if the number of licenses in use has reached the number of purchased licenses (e.g., 50 licenses), the FRXDRV 202 can perform an action 706 that is to hide access at block 712. The FRXDRV 202 can then provide a response indicative that no such font exists, so users without permission or users with permission when the maximum number of font licenses has already been used will not have access to the font. In such examples, the operating system and/or application may not realize it is being denied access to the font, instead thinking that no such font exists at all. In some embodiments, a user may request access to a font on the fly, such as by filling out a webform or by calling an administrator. The on-the-fly access request may update the rules or information used to evaluate the rules at block 704, resulting in the user being able to now access the font. In some embodiments, because the rule evaluation at block 704 is carried out during runtime, the user may be able to access the font without needing to restart the system and/or the application. In other embodiments, other resources besides fonts may be hidden, such as printers, software, or other suitable resources.

In examples where the rule evaluates at block 704 to provide a modified response, the action performed at block 706 can be to provide a modified response at block 714. The modified response can be based entirely on the rule that is evaluated at block 704. The modified response can be a static and/or dynamic response that is populated without accessing the actual requested resource. In some embodiments, the modified response can be based in part on the desired resource 718 (e.g., the FRXDRV 202 can access resource 718 to obtain some or all of the information from the resource 718, then generate a modified response using some or all of the information from the resource 718 and some information from the rule).

In examples where the rule evaluates at block 704 to perform a secondary action, the action performed at block 706 can be to perform a secondary action at block 716. The secondary action that is performed at block 716 can be any suitable action available to be performed by the FRXDRV 202. For example, when the user initiates an action for which the FRXDRV 202 intercepts the request at block 702 and for which a secondary action is evoked during rule evaluation at block 704, the FRXDRV 202 can perform a secondary action at block 716, such as updating a separate log file. Other secondary actions that are not directly related to the user's initial action and/or request can be performed. For another example, when a user attempts to open a piece of software, the FRXDRV 202 can intercept the request at block 702, evaluate a rule at block 704, then perform an action at block 706 that is to perform a secondary action at block 716 that includes copying a resource, which may be necessary or useful for running of the piece of software, from a remote location to a local location. Many other secondary actions can be performed.

In some embodiments, performing an action at block 706 can include performing one or more of passing the request at block 708, redirecting the request at block 710, hiding access at block 712, providing a modified response at block 714, and performing a secondary action at block 716. For example, a request can be intercepted at block 702 and a rule can be evaluated at block 704 that causes the request to be passed at block 708 to the resource 718 while simultaneously performing a secondary action at block 716.

In some embodiments, evaluation of a rule at block 704 can include the evaluation of a plurality of rules, resulting in the performance of one or more actions at block 706.

Because the FRXDRV 202 is able to evaluate the rule at block 704 during runtime, it is able to perform actions at block 706 that directly affect processes and threads. For example, the FRXDRV 202 can be used to control, each in a different way, two concurrently running applications that attempt to access the same resource. Because the FRXDRV 202 is evaluating rules at block 704 during runtime, it can take advantage of numerous variables, such as current time, date, user, user group, location, and other variables, such as variables updatable during runtime.

In some embodiments, the FRXDRV 202 can be used to sandbox a particular program, process, or application, thus allowing it to run in an isolated environment, by intercepting all requests made by the particular program, process, or application at block 702 and performing actions at block 706 such as redirecting the requests at block 710 or providing modified responses at block 714 (e.g., simulating that the program has changed a file while the file on the system remains unchanged). This sandboxing technique can be used to isolate potential or known viruses, as well as files downloaded from a network connection (e.g., web application and/or web downloads). Rules can be used that provide automatic detection of intercepted requests that should be sandboxed.

In some embodiments, the FRXDRV 202 can enable ultra-rapid software deployment in various ways. In an embodiment, the software desired for ultra-rapid deployment can be pre-loaded onto a local machine, but can be hidden for all users (e.g., via hiding access at block 712) until it is desired to "deploy" the software to one or more users. An administrator can then update rules/assignments files 204 or can modify a user's permissions or user group membership to enable access to the software, thus "deploying" the software on that user's system. In another embodiment, the software desired for ultra-rapid deployment can reside on a remote system or on attached storage (e.g., not on the local machine), but the FRXDRV 202 can be used to redirect requests (e.g., by redirecting requests at block 710) such that a user's system may think it is accessing a locally stored copy of the software while the FRXDRV 202 is redirecting those requests to the remote system or attached storage, thus "deploying" the system on the user's system at an ultra-rapid speed. In these examples, the full software need not be copied to the user's system, but either already resides on the user's system or is directly accessible as if it resided on the user's system.

The FRXDRV 202 can enable additional functionality through the use of the techniques described herein.

Figure 8:
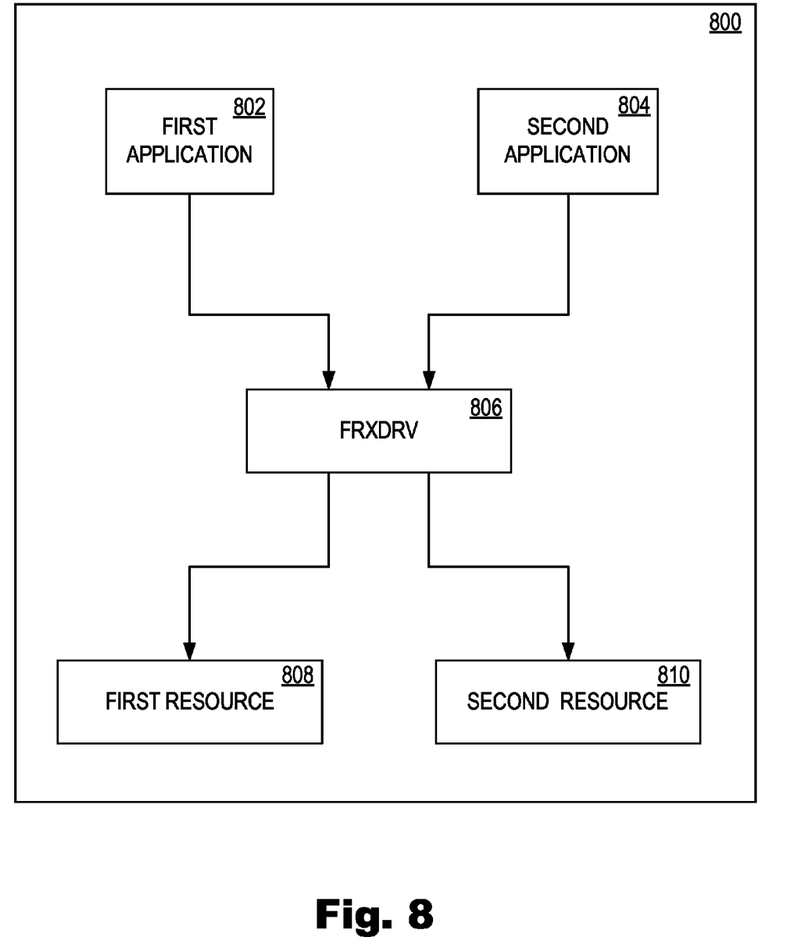
FIG. 8 is a process flow diagram illustrating operation of an FRXDRV running in runtime on a system according to one embodiment.

FIG. 8 is a process flow diagram illustrating operation of an FRXDRV 806 running in runtime on a system 800 according to one embodiment. The system 800 can include a first application 802 and a second application 804. The first application 802 and second application 804 can both attempt to access the same resource (e.g., the most recent version of JAVA installed on the system). The first application 802 and second application 804 can each send requests for the resource, which are intercepted by the FRXDRV 806. As discussed above, the FRXDRV 806 can intercept the requests and evaluate at rule to determine how to process the requests. The FRXDRV 806 can determine that the first application 802 should have access to first resource 808, which may be the originally intended resource to which the first application's 802 request was directed (e.g., the most recent version of JAVA installed on the system). However, the rules evaluated by the FRXDRV 806 can determine that the second application 802 should have access to second resource 810 (e.g., a resource which may be an older version of JAVA that would work better with the second application 804). The FRXDRV 806 can then redirect the second application's 804 request to the second resource 810 (e.g., thus providing the second application 804 with the older version of JAVA).

In some embodiments, the first application 802 and second application 804 can both be separate windows, processes, or instances of the same application or piece of software.

The flowcharts of FIGS. 3-8 show the functionality and operation of implementations of the FRXDRV 202 described herein. If embodied in software, each block in the flow charts may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although each of the flowcharts shows a specific order of execution, it is understood that the order of execution may differ in practice from that which is depicted. For example, the order of execution of two or more block in any of the flow charts may be scrambled relative to the order shown. Also, two or more blocks shown in succession may be executed concurrently or with partial concurrence. Further, in some embodiments, one or more of the blocks shown in any of the flowcharts may be skipped or omitted or substituted with alternative blocks. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or program module described herein, including the FRXDRV 202, the FRX Service 210, the FRX.EXE 208 and the rule/assignment editor tool 206, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

What is claimed is:

1. A computing terminal, comprising:
 a memory for storing an operating system and a plurality of resources, wherein the operating system comprises computer-implemented instructions for implementing one or more user mode processes in a user mode capable of interacting with one or more kernel mode components in a kernel mode for performing operations relating to the plurality of resources; and
 a processor for executing the computer-implemented instructions of the operating system, wherein the operating system is configured to implement a filter driver to hide one or more indications of a presence of a resource of the plurality of resources from a user by performing steps comprising:
  receiving, in the kernel mode, an access request to perform an operation relating to a resource;
  determining, in the kernel mode, whether the resource is to be hidden from the user, wherein determining whether the resource is to be hidden comprises accessing one or more rules associated with the resource;
  if the resource is to be hidden from the user, returning an indication that the resource is not present on the computing terminal, wherein returning the indication comprises returning a message indicating that the resource is not found; and if the resource is not to be hidden from the user, passing the request to another component of the operating system to perform the operation and thereby allow access to the one or more indications of the presence of the resource.

2. The computing terminal of claim 1, wherein the request to perform the operation comprises an IO request to open or create a file or to open or create a directory.

3. The computing terminal of claim 2, wherein the IO request is received from a filter manager component of the operating system.

4. The computing terminal of claim 1, wherein the request to perform the operation comprises a system call to open or create a registry key.

5. The computing terminal of claim 4, wherein the system call is received from a configuration manager component of the operating system.

6. The computing terminal of claim 1, wherein the filter driver is configured to hide all indications of the presence of the resource.

7. The computing terminal of claim 1, wherein the access request to perform the operation relating to the resource is a request to access an additional resource that is indicative of the presence of the resource.

8. A computing terminal, comprising:
- a memory for storing an operating system and a plurality of resources, wherein the operating system comprises computer-implemented instructions for implementing one or more user mode processes in a user mode capable of interacting with one or more kernel mode components in a kernel mode for performing operations relating to the plurality of resources; and
- a processor for executing the computer-implemented instructions of the operating system, wherein the operating system is configured to implement a filter driver to hide one or more indications of a presence of a resource of the plurality of resources from a user by performing steps comprising:
  - receiving, in the kernel mode, an enumeration request;
  - determining, in the kernel mode, a context for the enumeration request,
  - determining, in the kernel mode, that the enumeration request relates to the resource, wherein determining that the enumeration request relates to the resource includes using the determined context;
  - determining, in the kernel mode, whether the resource is to be hidden from the user, wherein determining whether the resource is to be hidden comprises accessing one or more rules associated with the resource;
  - if the resource is to be hidden from the user, intercepting a result of the enumeration request, modifying the result to remove information pertaining to the resource to be hidden, and returning a modified version of the result; and
  - if the resource is not to be hidden from the user, passing the enumeration request to another component of the operating system for performance of the enumeration request without modifying a result of the enumeration request.

9. The computing terminal of claim 8, wherein the enumeration request comprises a directory query.

10. The computing terminal of claim 9, wherein the directory query is received from a filter manager component of the operating system.

11. The computing terminal of claim 8, wherein the enumeration request comprises a system call to enumerate a registry key.

12. The computing terminal of claim 11, wherein the system call is received from a configuration manager component of the operating system.

13. The computing terminal of claim 8, wherein the filter driver is configured to hide all indications of the presence of the resource.

14. The computing terminal of claim 8, wherein the enumeration request is a request for enumeration of another resource that is indicative of the presence of the resource.

* * * * *